W. A. BISHOP.
COPYING CAMERA.
APPLICATION FILED AUG. 30, 1912. RENEWED OCT. 14, 1914.
1,120,014.
Patented Dec. 8, 1914.
3 SHEETS—SHEET 3.
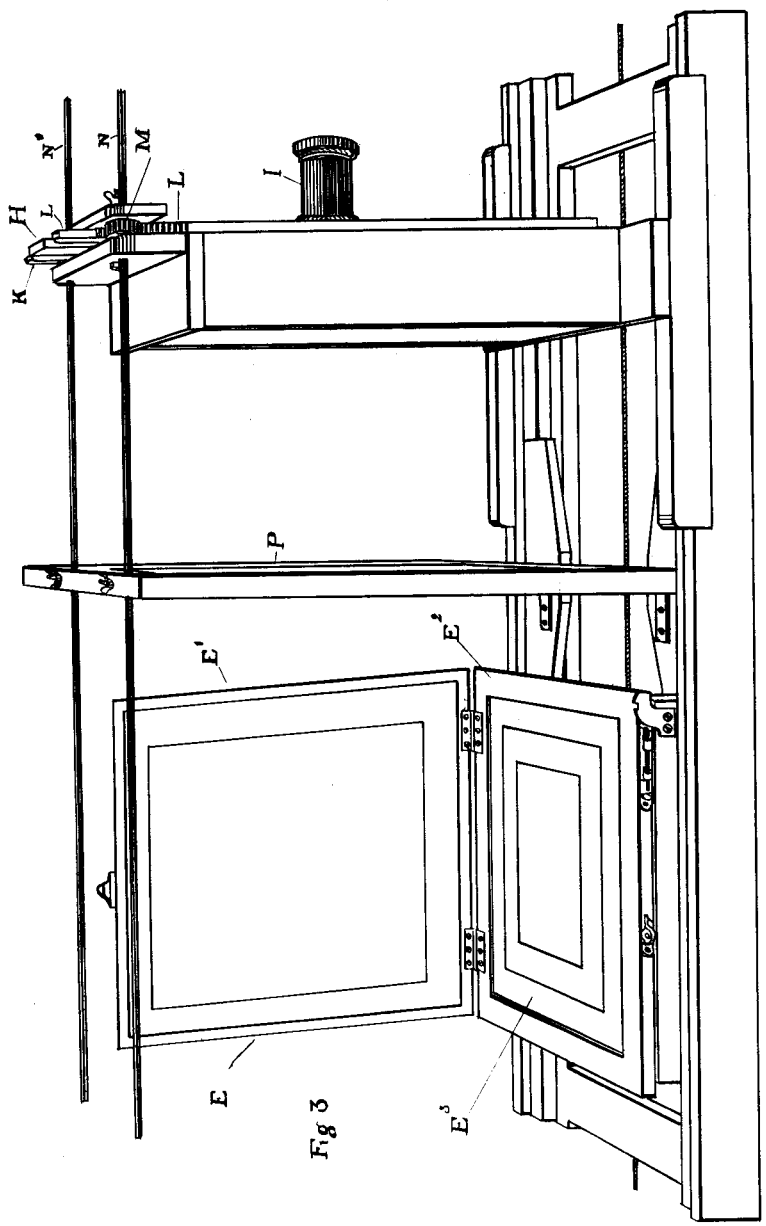
WITNESSES:
C. B. Belknap
W. K. Ford
INVENTOR
WILLARD A. BISHOP.
BY
ATTORNEYS

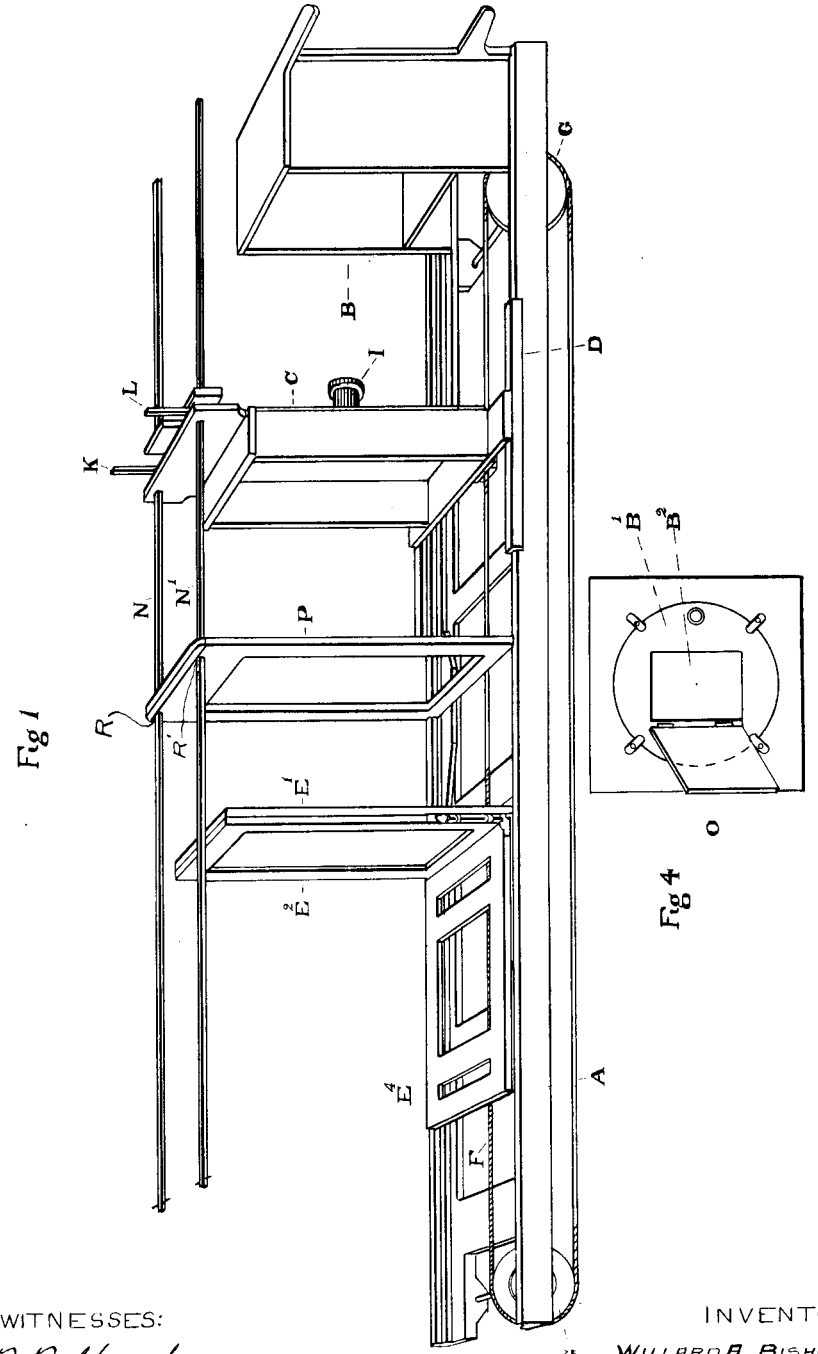

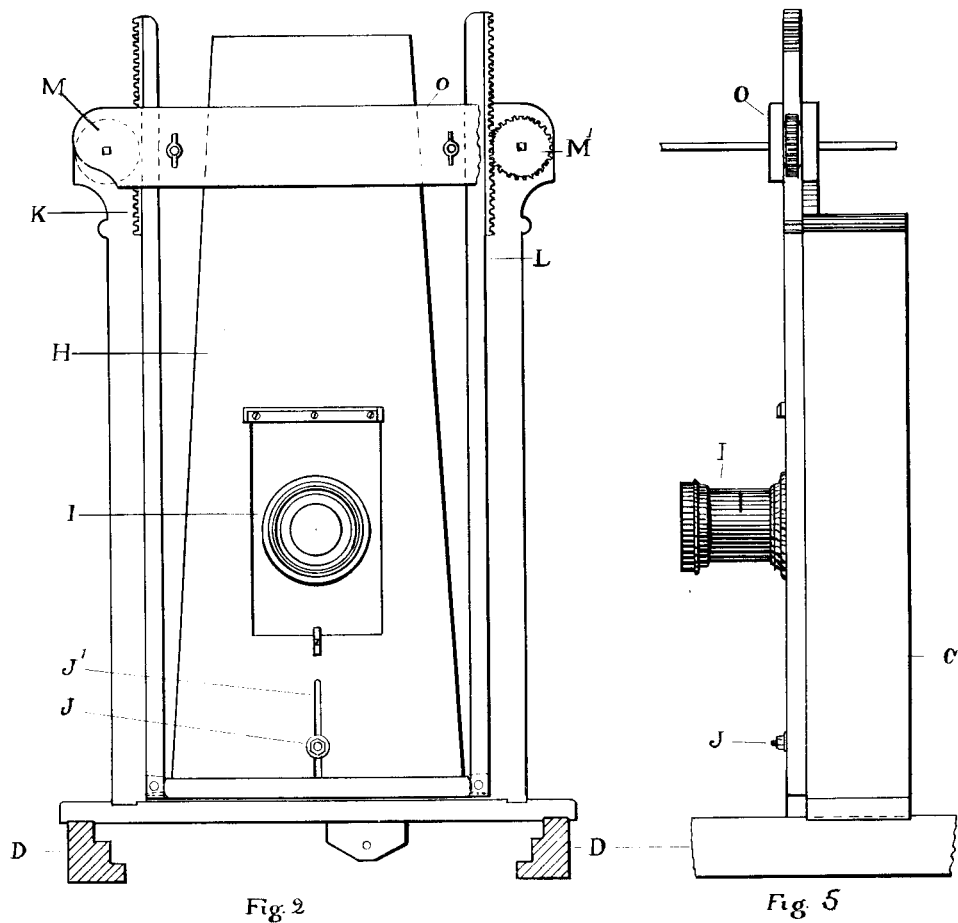

UNITED STATES PATENT OFFICE.

WILLARD A. BISHOP, OF SANDUSKY, OHIO.

COPYING-CAMERA.

1,120,014.     Specification of Letters Patent.     Patented Dec. 8, 1914.

Application filed August 30, 1912, Serial No. 717,827. Renewed October 14, 1914. Serial No. 866,731.

*To all whom it may concern:*

Be it known that I, WILLARD A. BISHOP, a citizen of the United States of America, residing at Sandusky, in the county of Erie and State of Ohio, have invented certain new and useful Improvements in Copying-Cameras, of which the following is a specification, reference being had therein to the accompanying drawings.

The invention relates to cameras designed for use in printing from photographic negatives and adapted to either enlarge or reduce the size of the image.

It is the object of the invention to provide convenient means for manipulating the instrument as hereinafter set forth.

In the drawings: Figure 1 is a perspective view of the camera. Fig. 2 is a front elevation of the shiftable lens holder. Fig. 3 is a perspective view of the combined focusing screen and film holder in a position for engagement with the film. Fig. 4 is an elevation of the negative holder. Fig. 5 is a side elevation of the shiftable lens holder.

In the enlargement of photographs the focusing screen is frequently placed a considerable distance from the lens and negative holder. To adjust the focus to obtain the proper size picture there must be a longitudinal movement of the lens and to properly center the image on the screen it is necessary also to adjust the lens laterally both in a vertical and in a horizontal direction. As a consequence it is usually necessary for the operator to walk back and forth from the screen to the lens holder before the desired adjustment is obtained, and inasmuch as the distance is too great for him to carefully observe the image from the position of the lens the difficulty is increased.

It is one of the objects of the present invention to provide means operable from the position of the screen for adjusting the lens both as to focusing and for centering the image upon the plate.

It is a further object to provide a convenient means for holding the films upon which the pictures are printed so that they are in exact focus and may be quickly exchanged.

My improved instrument comprises a suitable bed A on which the various parts of the instrument are adjustably mounted.

B is a negative holder mounted upon the forward part of the bed; C is a lens holder longitudinally slidable upon parallel ways D upon the bed; this lens holder as shown, being in the form of a box member open at the rear side, and E is the holder for the focusing screen also adjustable upon the ways D in rear of the lens holder C.

As has been stated, the focusing screen is usually spaced a considerable distance from the lens holder, and I have therefore provided means of adjustment for the lens operable from a position adjacent to the screen. For this purpose I have provided a focusing adjustment, which, as shown, comprises an endless cord F engaging pulleys G at opposite ends of the frame A, and attached to the lens holder C. In addition to the longitudinal adjustment of the lens for focusing I have provided lateral adjustment both vertical and horizontal. This preferably comprises a front H upon which the lens I is mounted, said front being secured by a pin J engaging a slot J' therein to the member C. The front H is preferably of the tapering form shown, the end opposite that secured to the pin J being of lesser width and providing clearance for a lateral adjustment.

K and L are rack-bars arranged upon opposite sides of the front H, and pivotally connected thereto at their lower ends. M and M' are pinions engaging said rack-bars, and respectively mounted upon rods N and N', which extend longitudinally of the bed and at the upper corners of the lens holder C. The rods N and N' are respectively supported in bearings O upon the lens holder C and also upon bearings R R' in a slidable standard P, supported on the bed, and which is centrally cut away to permit the passage of the light from the lens. The arrangement is such that by rotating the rods N and N' the front H may be raised or lowered on either or both sides, while a differential movement on the two sides will cause a lateral swinging of the front to either one side or the other of the lens holder C. Thus if the rack-bar K is raised a greater distance from the bottom of the lens holder than the rack-bar L, the top of the front H will be rocked toward the bar L.

The holder E for the screen or ground glass preferably also constitutes the means for securing the sensitive film on which the picture is printed. To this end said holder comprises two frames E' and E², arranged parallel to each other, the frame E' holding a clear or transparent glass, while the frame E² holds the ground glass. When the frames are closed the two glasses will be in close proximity and therefore the sensitive paper or film will be clamped therebetween, and held in the plane of the ground glass on which the image has been focused. Mats E³ of varying sizes may be placed between the frames for holding and centering different sized sheets of the sensitive film. The frame E² is hinged to a base plate E⁴, which is slidable upon the bed, the arrangement being such that when the film is to be placed in the holder the frame E² may be let down upon the base E⁴, and the frame E' opened as shown in Fig. 3. Thus the placing and removal of the film is more easily performed in this horizontal position than would be the case if the frame remained vertical.

In use, the operator first positions the member E approximately according to the enlargement desired and the standard P is adjusted so as to support the rods N and N'. The camera is preferably placed in a dark room, the light for printing being admitted through the negative holder B in which the negative to be printed is placed. The operator, then taking his position adjacent to the focusing screen E, can adjust the member C longitudinally until a sharp focusing of the image upon the screen is obtained. This image may not be properly centered but the centering is quickly effected by manipulation of the rods N and N', which when rotated will actuate their corresponding pinions M and M', which in turn actuate the rack-bars K and L. These bars are preferably square or polygonal in section and are slidable in the pinions M and M', so that the lens holder C may be adjusted to any position without longitudinal movement of the rods. The rods extend the full length of the bed so that the operator can rotate them from whatever position he may be in, and by the proper manipulation, the lens may be adjusted from vertical to lateral.

A further function performed by the rods N and N' is that of a frame for holding a light-screen where the room in which the camera is placed is not free from actinic light. This cloth may be thrown over the rods extending from the lens holder to the screen and will protect the sensitive film on the latter from injury.

After the image is properly focused and centered upon the screen the operator may successively print any desired number of films. In performing this work the frame E² is folded down into horizontal position upon the member E⁴, the frame E' is swung open, and the film placed over the ground glass, and then clamped by the closing of the frame E'. This operation is performed more conveniently when the frame is in horizontal position than would be possible in the vertical position, and after the clamping of the film the frame E² may be turned up into vertical position and the printing effected.

To facilitate the proper positioning of the image upon the screen, the negative holder B is preferably provided with a rotatively adjustable front B', in which the negative B² is carried. This will permit of correcting any inaccuracy in the negative, where the vertical lines thereof are not strictly accurate.

Where it is desired to soften the picture, it is advantageous to use a screen adjacent to the negative. For this purpose I have provided a hinged screen O, which is preferably attached to the rotatively adjustable negative holder B', and may be turned alternatively into parallelism with said negative or out of registration therewith. In use, the screen may be placed in front of the negative for a portion of the exposure and then turned away for the remainder of the exposure, thereby obtaining the desired softening effect.

What I claim as my invention is:

1. In an enlarging camera the combination with a negative holder and a screen adjustable in relation to each other, of a lens holder arranged intermediate said negative holder and screen, and means operable from the position of the screen for adjusting the lens to focus and center the image.

2. The combination with a bed of a negative holder and a screen relatively adjustable upon said bed, a lens holder adjustably mounted upon said bed intermediate said negative holder and screen, means operable from the position of the screen for adjusting said lens holder longitudinally for focusing the image and means also operable from the position of the screen for adjusting the lens laterally upon its holder to center the image.

3. The combination with a bed of a negative holder and a screen relatively adjustable upon said bed, a lens holder adjustably mounted upon said bed intermediate said negative holder and screen, means operable from the position of the screen for adjusting said lens holder longitudinally to focus the image on the screen, said lens holder having a slidable front, and means also operable from the position of the screen for adjusting said slidable front vertically and horizontally to center the image on the screen.

4. The combination with a bed of a negative holder and a screen relatively adjustable upon said bed, a lens holder intermediate said negative holder and screen longitudinally slidable upon said bed, means operable from the position of the screen for sliding said lens holder, a slidable front for said lens holder in which said lens is mounted, rack and pinion connections for adjusting said slidable front vertically and horizontally, and rods for rotating said pinions rearward to said screen and operable from this position.

5. In an enlarging camera the combination with a bed and a lens holder adjustably supported on said bed, of a slidable front upon said lens holder, movable vertically and laterally, means for raising and lowering the opposite sides of said sliding front differentially to produce either vertical or lateral adjustment, and a pair of rods for operating said differential raising and lowering means, extending parallel with said bed.

6. In an enlarging camera the combination with a bed of a lens holder slidably mounted thereon, a vertically and laterally slidable front for said lens holder, and rods having a rack and pinion engagement with said slidable front for operating said slidable front, extending from said lens holder parallel with said bed and also constituting a support for a light-softening screen.

7. In an enlarging camera the combination with a bed of a lens holder slidably mounted upon said bed, a slidable front for said lens holder, means for separately raising and lowering opposite sides of said slidable front upon said lens holder, and rods engaging said raising and lowering means and extending parallel to said bed.

8. In an enlarging camera the combination with a bed and slidable lens holder mounted thereon, of a slidable front for said lens holder, racks connected to opposite sides of said slidable front for raising and lowering the same independently, pinions engaging said racks, and rods slidably engaging said pinions, extending parallel to said bed and operable at a distance from said lens holder.

9. In an enlarging camera the combination with a bed of a negative holder and a screen adjustable in relation to each other upon said bed, a lens holder intermediate said negative holder and screen, a frame intermediate said lens holder and screen, and rods for adjusting said lens extending parallel to said bed at the opposite sides and top of said lens holder, said rods being supported upon said intermediate frame, and also constituting a support for a light-softening screen.

10. In an enlarging camera the combination with a bed of a negative holder and a screen adjustable in relation to each other upon said bed, a lens holder intermediate said negative holder and screen, an endless belt extending longitudinally of said bed and attached to said lens holder for adjusting the same, rods extending parallel to said bed at the upper opposite corners of said lens holder, a slidable front for said lens holder, connections between said rod and slidable front whereby the slidable front is operable by the adjustment of said rods, and an intermediate support for said rods.

In testimony whereof I affix my signature in presence of two witnesses.

WILLARD A. BISHOP.

Witnesses:
JAMES P. BARRY,
W. K. FORD.